(12) United States Patent  (10) Patent No.: US 8,408,920 B2
Speller  (45) Date of Patent: Apr. 2, 2013

(54) TRAINING AID

(75) Inventor: Tessa Louise Speller, Victoria (AU)

(73) Assignee: Bayer Healthcare LLC, Tarrytown, NY (US)

( * ) Notice: Subject to any disclaimer, the term of this patent is extended or adjusted under 35 U.S.C. 154(b) by 443 days.

(21) Appl. No.: 12/514,391

(22) PCT Filed: Nov. 10, 2006

(86) PCT No.: PCT/AU2006/001676
§ 371 (c)(1),
(2), (4) Date: Nov. 24, 2009

(87) PCT Pub. No.: WO2008/055284
PCT Pub. Date: May 15, 2008

(65) Prior Publication Data
US 2010/0062408 A1   Mar. 11, 2010

(51) Int. Cl.
*G09B 23/28*  (2006.01)
(52) U.S. Cl. ........ 434/268; 434/267
(58) Field of Classification Search ........ 434/262, 434/267, 268, 272
See application file for complete search history.

(56) References Cited

U.S. PATENT DOCUMENTS

| 2,995,832 | A |   | 8/1961 | Alderson |
| 5,795,157 | A |   | 8/1998 | Weber et al. |
| 5,839,904 | A | * | 11/1998 | Bloom ............ 434/268 |
| 7,306,465 | B2 | * | 12/2007 | White ............. 434/268 |
| 7,621,749 | B2 | * | 11/2009 | Munday .......... 434/262 |
| 7,931,471 | B2 | * | 4/2011 | Senagore et al. .... 434/267 |
| 7,988,451 | B2 | * | 8/2011 | Battaglia, Jr. ..... 434/267 |
| 2006/0269906 | A1 |   | 11/2006 | White |

FOREIGN PATENT DOCUMENTS

WO   WO 99/31641   6/1999

* cited by examiner

*Primary Examiner* — Kurt Fernstrom
(74) *Attorney, Agent, or Firm* — Bayer Healthcare LLC

(57) ABSTRACT

A training aid for practicing inserting a needle in a vein, the aid including:
 a base which is resistant to penetration by a needle;
 a tube located on one side of the base;
 a covering which extends over the base and the tube, the arrangement being such that the other side of the base can be placed on the skin of a person so that a needle can then be inserted through the covering to penetrate the tube so as to simulate insertion through the skin and penetration of the vein of the person.

23 Claims, 5 Drawing Sheets

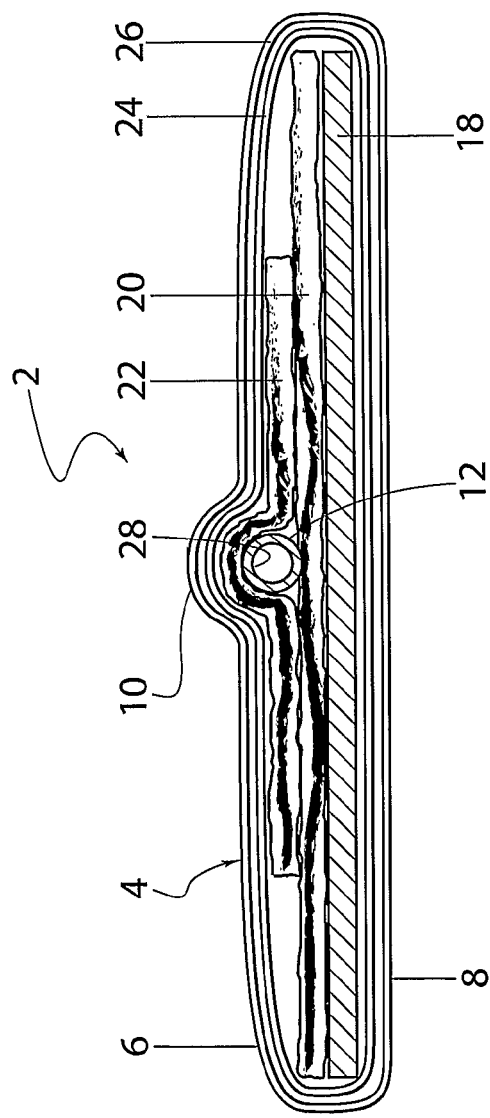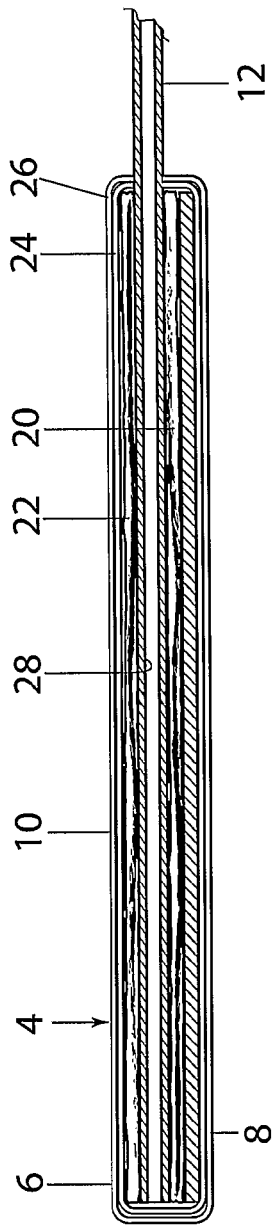

TRAINING AID

This invention relates to a training aid.

More particularly, the invention relates to a training aid for assisting in the training of people to insert needles correctly into a vein. The aid can be used by persons who need to insert the needle into the vein of another person or alternatively can be used for training persons who need to insert the needle into their own vein.

At the present time there are basically two techniques which are used for training of people to insert needles into veins. The first technique is to train people on live subjects but this has an obvious disadvantage because it causes pain and possible injury to the subject upon whom the training is carried out. The second technique involves the use of artificial arms but this has a disadvantage that the practice of injecting needles into artificial components is different from the real life situation, particularly where a person is being trained to insert a needle in themselves. Also, after the artificial limb has been used, the puncture marks from previous uses are evident and this reduces the value of the training because trainees can readily identify the appropriate place to insert the needle instead of identifying it for themselves.

The object of the present invention is to provide a novel training aid which at least partially overcomes the drawbacks noted above.

According to the present invention there is provided a training aid for practicing inserting a needle in a vein, the aid including:

a base which is resistant to penetration by a needle;

a tube located on one side of the base;

a covering which extends over the base and the tube, the arrangement being such that the other side of the base can be placed on the skin of a person so that a needle can then be inserted through the covering to penetrate the tube so as to simulate insertion through the skin and penetration of the vein of the person.

Preferably, the covering includes a first layer of padding and an outer layer which envelops the base, tube and first layer of padding.

Preferably further, the aid includes a second layer of padding which extends over said one side of the base and beneath the tube.

Preferably further, the covering includes an inner layer of adhesive material which is wrapped over the first layer of padding, parts of the second layer of padding and the other side of the base, the inner layer being located beneath the outer layer.

Preferably further, the base is made of relatively rigid plastics materials; the tube is made of resilient plastics material; the first and second layers of padding comprise layers of cotton wadding; and wherein the outer layer is a resilient sheet of plastics material having adhesive on its underside.

In a preferred arrangement, the outer layer is skin coloured and the aid is somewhat raised in the region where the tube is located. This simulates the appearance of a vein which has been palpated. The trainee tries to insert the needle into the aid so that the tip of the needle is located in the interior of the tube. With the training aid of the invention, the construction is such that the initial penetration of the tip of the needle through the outer layer and the first layer of padding closely resembles the actual experience of inserting the tip of the needle through the skin of a real patient. Further, when the tip of the needle strikes the tube and penetrates it, there is initially somewhat increased resistance followed by a decrease in resistance as the needle enters the lumen of the tube. Again this closely resembles the experience of causing the tip of the needle to penetrate the wall of a real vein.

Because the training aid can be applied to a subject at a location corresponding to where venipuncture would be carried out, this also increases the value of the training exercise.

In a particular preferred embodiment of the invention, the tube includes red liquid under pressure. The arrangement is such that when the needle penetrates the tube, the red liquid will flow through the needle and be visible to the trainee. This gives a visual indication that the vein has been correctly penetrated. This also closely simulates the actual experience of a flashback of blood which occurs when a needle penetrates a real vein.

The invention also provides a method of training a trainee to insert a needle in a vein, the method including the steps of:

fixing a training aid having a base and a simulated vein which has simulated blood therein on the skin of a subject;

causing a trainee to insert a needle into the training aid so as to penetrate the simulated vein; and permitting the simulated blood to flow under pressure through the needle so as to provide a visual indication that the needle has correctly penetrated the simulated vein.

The invention also provides a kit for training a trainee to insert a needle in a vein, the kit including:

a training aid as defined above;

a self-adhesive transparent patch for fixing the training aid on the skin of a subject; and a needle which can be used by the trainee to insert the tip thereof into the tube of the training aid.

The invention also provides a training aid for practicing inserting a needle in a vein, the aid including:

a body having an upper surface and a lower surface;

the body including a base which is resistant to penetration by a needle;

the upper surface including a ridge which simulates the appearance of a palpated vein;

the upper surface having a covering which can be penetrated by a needle; and means for mounting the body on the skin of a subject with the lower surface thereof engaging the skin of the subject.

It will be appreciated by those skilled in the art that the training aid of the invention would be particularly useful in teaching nursing, medical and pathology students the skill of venipuncture. Also, the training aid of the invention can be used to train children and parents the skill of venipuncture.

The invention will now be further described with reference to the accompanying drawings, in which:

FIG. 4 is an enlarged cross-sectional view along the line 4-4;

FIG. 5 is an enlarged cross-sectional view along the line 5-5;

Figure 1:
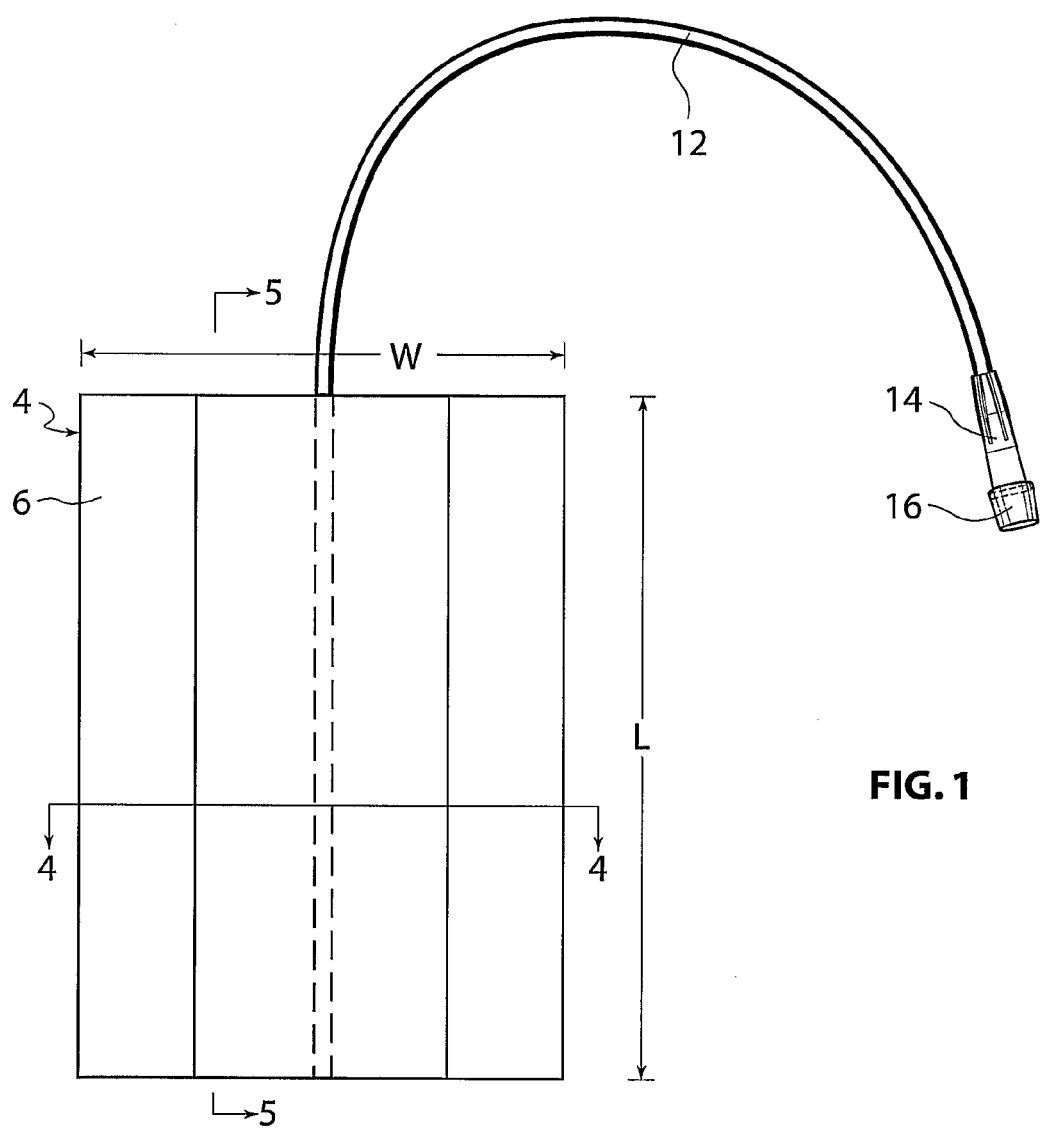
FIG. 1 is a plan view of a training aid of the invention.
Figure 2:
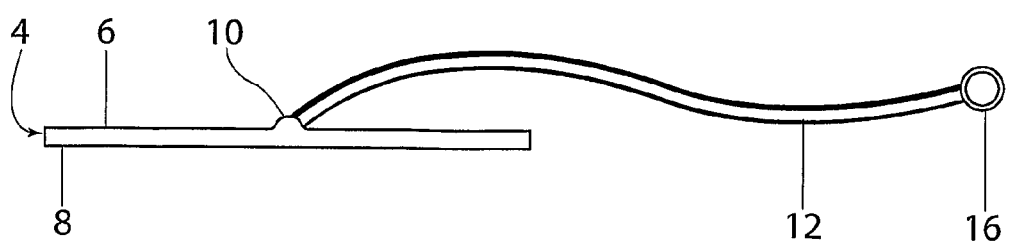
FIG. 2 is a side view of the training aid.

FIGS. 1 and 2 show a training aid 2 of the invention. The training aid includes a generally planar body portion 4 having an upper side 6 and lower side 8. The outer surface of the training aid is covered with plastic sheet material which is skin coloured, as will be described in more detail later. The upper side 6 is also somewhat pliable so that it has the general appearance and feel of the skin of a patient. The upper side 6 of the training aid includes a ridge 10 which has the general appearance of a palpated vein. The ridge 10 is formed by a tube 12 which extends out of the body 4 and terminates in a connector which can be closed by means of a screw threaded cap 16.

Figure 3:
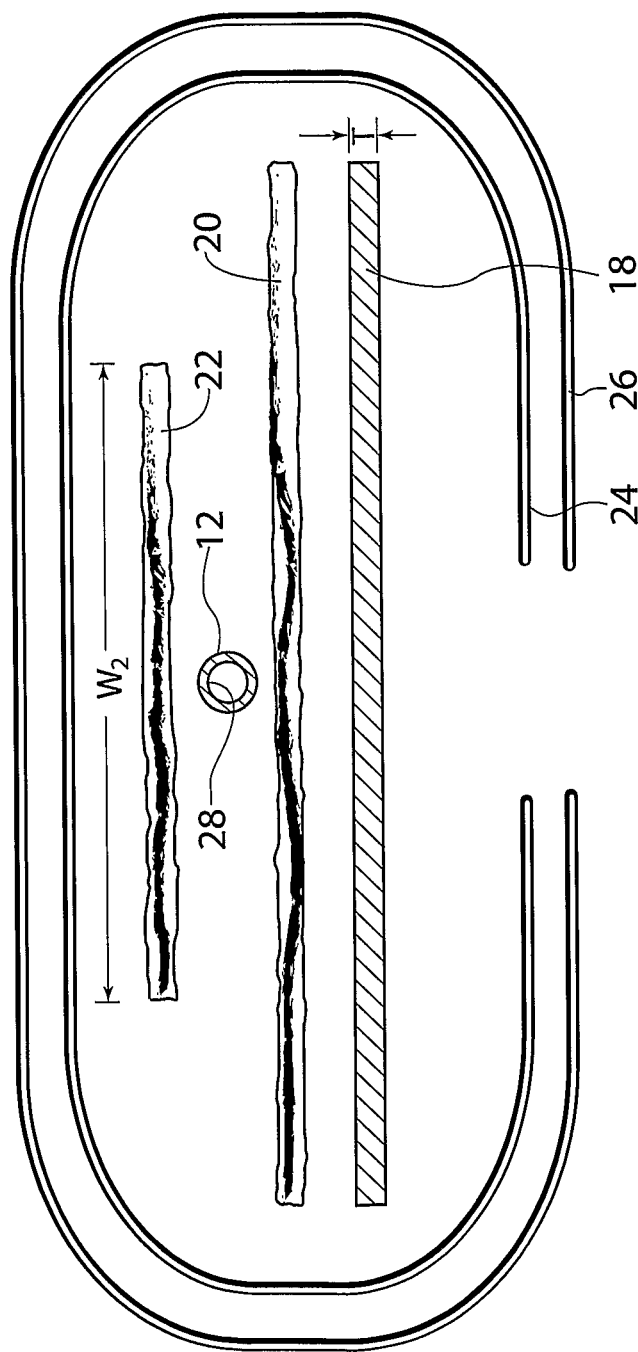
FIG. 3 is a schematic exploded view showing the components used to make the training aid.

FIGS. 3, 4 and 5 illustrate in more detail the manner in which the training aid can be constructed. The training aid 2 includes a base member 18 which preferably comprises a plate of thin plastics material which is rigid and cannot be normally penetrated by the tip of a needle. The base has a length L, width W and thickness T. Preferably the length L is about 50 mm to 60 mm, the width W about 35 mm to 45 mm and the thickness T about 1.5 mm to 2 mm. Suitable plastic material would include styrene, acrylic, ABS, polymethylmethacrylate (PMMA) or polycarbonate or any other relatively rigid material such as ceramic, metal or wood. The base 18 prevents the tip of the needle passing therethrough and stops the needle penetrating the skin of a subject to which the training aid is applied. A first layer 20 of padding material is placed above the base 18. The first layer 20 has the same dimensions as the base. The first layer 20 may comprise thin cotton wadding of a type which is applied to a patient before application of a plaster cast. The tube 12 is then located above the first layer 20. A second layer 22 of padding material is then located above the tube 12. In the illustrated arrangement, the second layer 22 is of the same material as the first layer but it is somewhat narrower, for instance having a width $W_2$ of say 10 mm to 20 mm. The training aid includes a first adhesive film 24 which is wrapped about the base 18, layers 20 and 22 and tube 12 so as to effectively bind them together into the body 4. The first film 24 may comprise a transparent self-adhesive film such as a Tegerderm patch cut to the appropriate size to envelop the inner components. The aid includes a second adhesive film 26 which is wrapped about the first film 24 and is adhered thereto. A second film 26 preferably is skin coloured. The second film 26 may be formed from an appropriate length of Sleek tape which is a type of waterproof adhesive strapping made by Smith & Nephew. The layers 20 and 22 of padding together with the skin coloured film 26 give the body 4 the look and appearance of this real skin. FIGS. 4 and 5 are enlarged cross-sectional views which show the base 18, layers 20 and 22 and tube 12 in their relative positions in the completed training aid.

In the preferred embodiment of the training aid, the tube 12 defines a lumen 28 which can be filled with red coloured liquid so as to simulate blood. The tube 12 may be formed from a known form of butterfly needle with attached tubing, the butterfly needle being cut therefrom. For instance the butterfly needle may comprise a Terumo SV*23BLK needle made by Terumo Medical Corporation. The tube in this product has an outer diameter of about 2 mm and an inner diameter of about 1.5 mm. Typically, the length is about 300 mm. The plastics material which forms the tube is soft and pliable but can be penetrated relatively easily by the tip of a needle. The plastics material may comprise PVC which has a plasticiser therein to make it soft and pliable with a Shore A hardness in the range of say 40 to 60 or polypropylene or polymethylene or any elastomer that will be recognised as useful by one skilled in the art. After the needle has been cut from the tube, a syringe can be used to inject red liquid such as water coloured by red food dye into the lumen of the tube. The syringe can be used to move the coloured liquid to a region adjacent to the part of the tube where the needle was cut. The end of the tube can then be sealed by heat sealing or simply by tying a knot therein. The lumen of the tube can then be pressurised so that the red liquid is held adjacent to the closed end of the tube. The liquid preferably has a length which is somewhat shorter than the length of the body 4 so that none of the red liquid would be visible in the exposed part of the tube 12.

The lumen of the tube can be pressurised using a syringe connected to the connector 14 of the tube. It has been found that forcing about 0.5 to 3 ml and preferably about 1 ml of air from the syringe into the lumen of the tube provides sufficient pressure therein, where the tube has a nominal length of 250 mm. Prior to disconnecting the syringe from the connector 14, the tube 12 temporarily is closed adjacent to the connector by forming a tight bend or kink therein. The cap 16 can then be reapplied to the connector 14 so as to maintain the pressure within the lumen.

In the preferred embodiment of the invention, when the tip of a needle penetrates the sidewall of the tube 12 so as to enter the lumen 28, the pressure within the lumen 28 will cause the red liquid to flow through the needle so as to provide an important visual indication to the trainee that the artificial vein has been correctly penetrated. The effect simulates the flashback which occurs when a needle penetrates a real vein in a subject.

Figure 6:
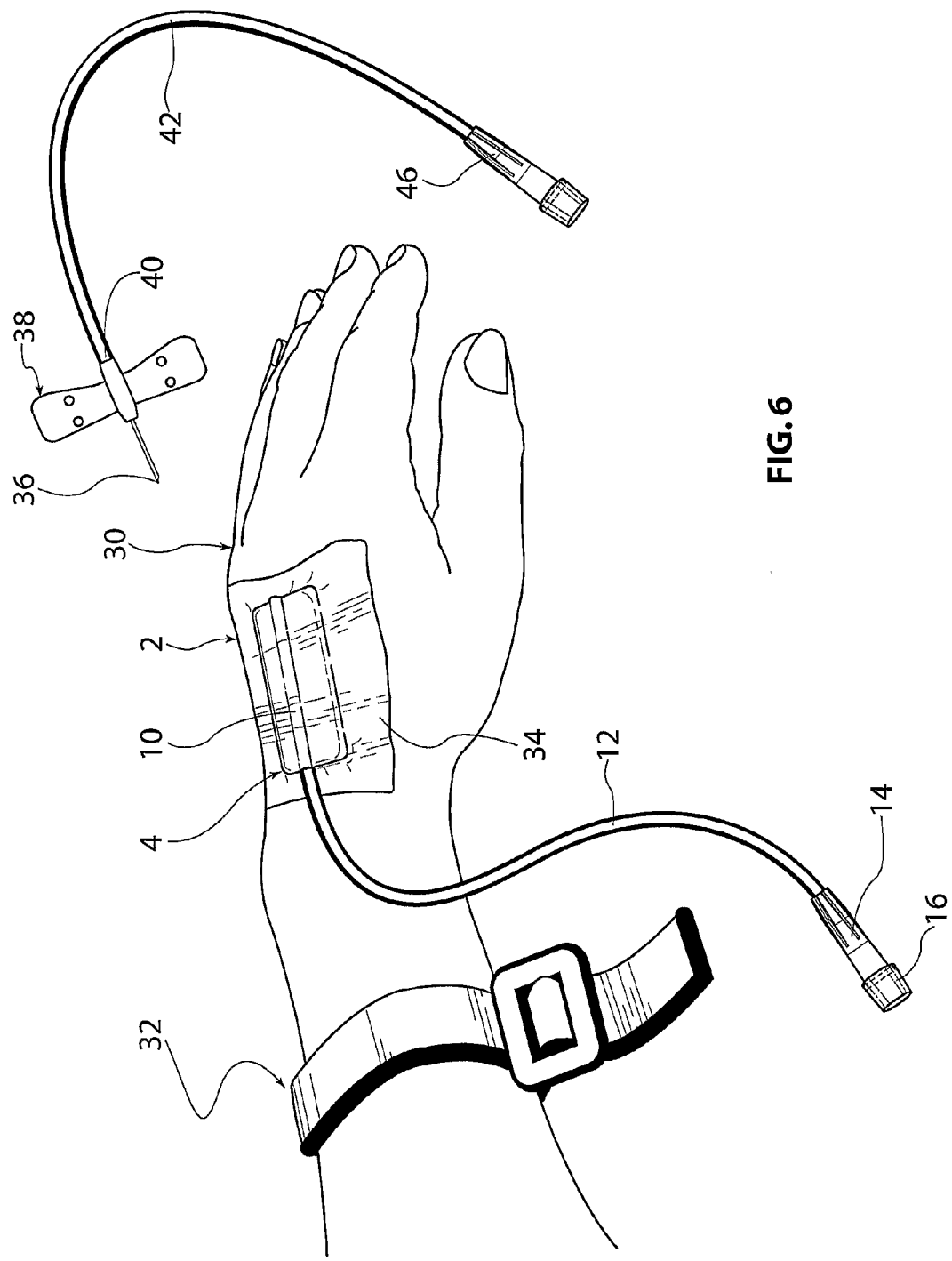
FIG. 6 shows the training aid applied to the hand of a subject.
Figure 7:
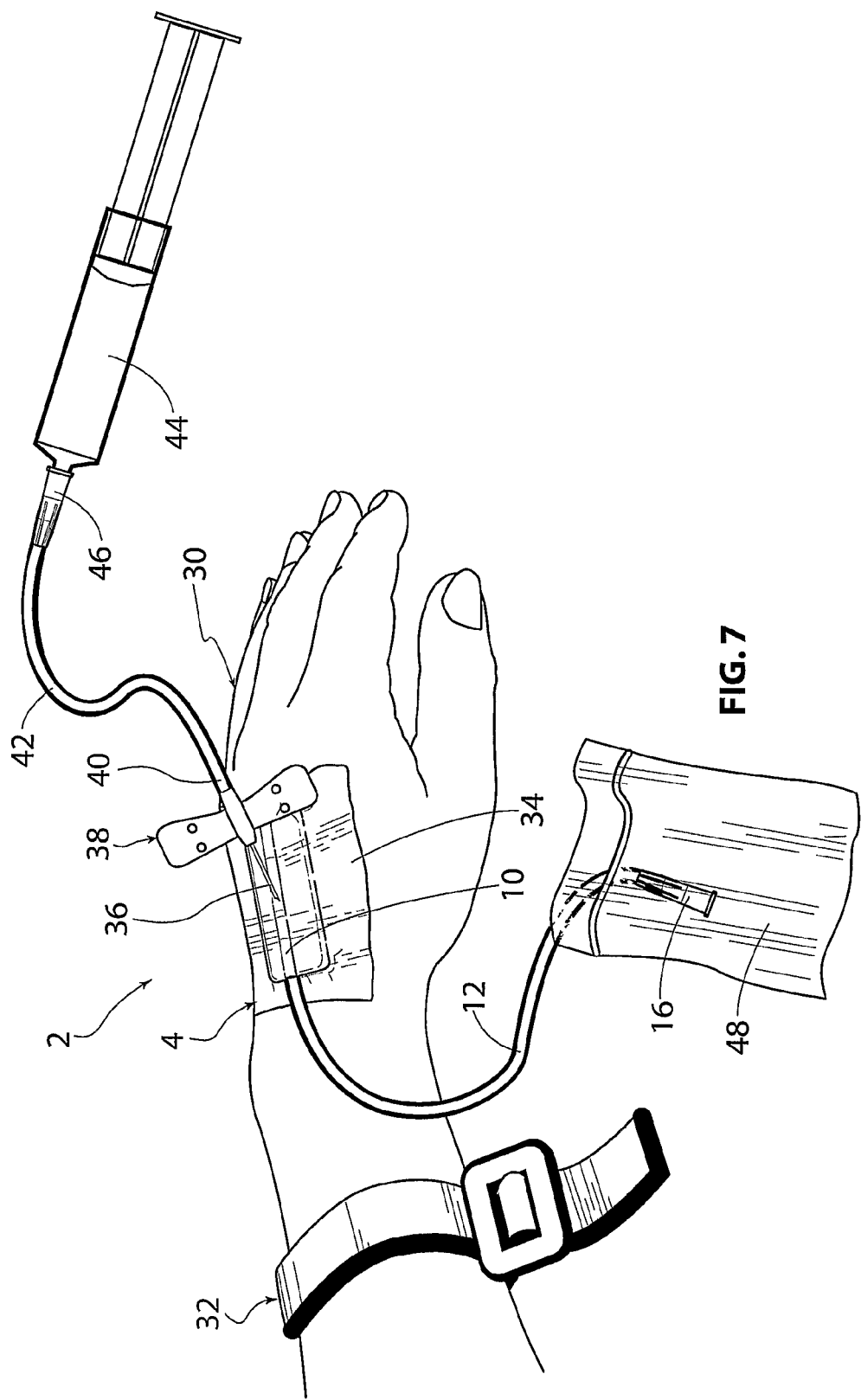
FIG. 7 shows a needle penetrating the training aid.

FIGS. 6 and 7 illustrate the use of the training aid of the invention. In this arrangement, the training aid 2 is applied to the back of the hand 30 of a subject. The ridge 10 is oriented in the same direction as the veins on the back of the hand, as shown. A tourniquet 32 can be applied so as to simulate the normal steps in venipuncture. In the illustrated arrangement, the training aid 2 is applied to the back of the hand by means of a transparent adhesive patch 34. This may, for instance, be a Tegerderm patch which is sufficiently long and wide to cover the entire body 4 and adhere to the skin of the hand.

It would be possible, of course, to attach the body 4 by other means. For instance, a self-adhesive layer could be provided on the lower side 8 of the body. Alternatively, the body 4 could be attached to a resilient band (not shown) which holds the body adjacent to the skin of the subject.

Once the training aid 2 has been applied to the skin of the subject, the trainee can then attempt to insert the tip 36 of a butterfly needle 38 into the lumen 28 of the tube 12 within the body 4. FIG. 7 shows the tip 36 inserted at the correct orientation through the ridge 10 into the lumen 28. Once this occurs, the red dye under pressure within the lumen will appear at the end 40 of the tube 42 of the butterfly needle 38. Once correct penetration has been effected, a syringe 44 containing a dummy solution can be coupled to the connector 46 of the butterfly needle 38 and the cap 16 of the tube 12 can be removed. The connector 14 can be located within a transparent collecting bag 48. The trainee then injects the dummy liquid using the syringe 44 through the needle tip 36 into the lumen 28. The dummy fluid will then pass through the tube 12 and drain into the bag 48. The dummy fluid flowing from the connector 14 thus provides a further useful visual indication to the trainee that the vein has been correctly penetrated by the tip of the needle 36. The needle 38 may comprise any suitable needle such as a Terumo SV*23BLK.

After all of the dummy fluid has been injected, the trainee can then practice the correct technique for removal of the butterfly needle 38.

It has been found that the device of the invention is particularly useful for training purposes because the body 4 has the look and feel of skin, the ridge 10 has the appearance and feel of a palpated vein. Further, when the tip 36 of the needle initially passes into the ridge 10 it has a similar feel to actual penetration of a needle into the skin of a patient. Further, when the tip of the needle penetrates the tube 12 and enters the lumen 28, it again simulates the effect of penetration of the needle into a real vein. The appearance of the red dye at the end 40 of the tube of the butterfly needle 38 simulates the flashback which occurs when a vein is penetrated. Finally, the visual feedback observed by the dummy fluid flowing from the tube 12 again provides visual feedback to the trainee that the venipuncture has been successful.

It will further be appreciated that the use of the training aid of the invention is safe and convenient.

Many modifications will be apparent to those skilled in the art without departing from the spirit and scope of the invention.

The invention claimed is

1. A training aid for practicing inserting a needle in a vein, the aid including:
    a base which is resistant to penetration by a needle;
    a tube located on one side of the base;
    a covering which extends over the base and the tube, the arrangement being such that the other side of the base can be placed on the skin of a person so that a needle can then be inserted through the covering to penetrate the tube so as to simulate insertion through the skin and penetration of the vein of the person;
    wherein the covering comprises (a) a first layer of padding, (b) an outer layer which covers the base, tube and first layer of padding, and (c) a second layer of padding which extends over said one side of the base and beneath the tube;
    and wherein the first layer of padding is narrower than the second layer of padding.

2. A training aid as claimed in claim 1 wherein the covering includes an inner layer of adhesive material which is wrapped over the first layer of padding, parts of the second layer of padding and the other side of the base, the inner layer being located beneath said outer layer.

3. A training aid as claimed in claim 1 including fixing means for fixing the aid to the skin of the person.

4. A training aid as claimed in claim 3 wherein the fixing means is an adhesive layer.

5. A training aid as claimed in claim 4 wherein the adhesive layer is transparent.

6. A training aid as claimed in claim 5 wherein the outer layer is skin coloured.

7. A training aid as claimed in claim 2 wherein:
    the base is made of relatively rigid plastics material;
    the tube is made of resilient plastics material;
    the first and second layers of padding comprise layers of wadding; and wherein
    the outer layer is a resilient sheet of plastics material having adhesive on its underside.

8. A training aid as claimed in claim 1 wherein the tube has an outer diameter in the range 1.5 mm to 7 mm.

9. A training aid as claimed in claim 8 wherein the tube has an inner diameter in the range from 1.0 mm to 6.5 mm.

10. A training aid as claimed in claim 1 wherein the interior of the tube includes coloured fluid which can flow from the tube when penetrated by a needle.

11. A training aid as claimed in claim 10 wherein the fluid is red to simulate blood.

12. A training aid as claimed in claim 10 wherein the fluid is held under pressure in the tube so that it will tend to flow through the needle when the needle penetrates the tube.

13. A training aid as claimed in claim 1 wherein the tube includes an extension which extends beyond the covering, the extension including a remote end, the arrangement being such that a test liquid can be injected through the needle into the interior of the tube and then flow from said remote end so as to provide a visual indication that the needle has been correctly inserted into the tube.

14. A training aid as claimed in claim 13 wherein the remote end is provided with a removable cap which, in use, is removed prior to injection of the test fluid into the tube.

15. A training aid as claimed in claim 14 including a container or bag for collecting the test fluid flowing from the remote end of the tube.

16. A method of training a trainee to insert a needle in a vein, the method including the steps of:
    fixing a training aid as defined in claim 1 which has simulated blood therein on the skin of a subject;
    causing a trainee to insert a needle into the training aid so as to penetrate the simulated vein; and
    permitting the simulated blood to flow under pressure through the needle so as to provide a visual indication that the needle has correctly penetrated the simulated vein.

17. A method as claimed in claim 16 wherein the trainee is the subject and the trainee fixes the aid to a site using adhesive.

18. A method as claimed in claim 17 wherein the trainee fixes the aid to the site using a transparent film having an adhesive layer thereon which is applied over the aid and adjacent parts of the skin of the trainee.

19. A method as claimed in claim 16 including the step of injecting a test liquid into the vein after insertion of the needle therein.

20. A method as claimed in claim 19 including the step of collecting the test liquid which has been injected into the vein.

21. A kit for training a trainee to insert a needle in a vein, the kit including:
    a training aid as defined in claim 1;
    a self-adhesive transparent patch for fixing the training aid on the skin of a subject; and
    a needle which can be used by the trainee to insert the tip thereof into the tube of the training aid.

22. A kit as claimed in claim 21 wherein the needle comprises a butterfly needle having an attached tube.

23. A kit as claimed in claim 21 including a container which can be used for collection of a dummy fluid injected through the butterfly needle into the tube of the training aid.

* * * * *